US010926232B2

(12) United States Patent
Yaginuma

(10) Patent No.: US 10,926,232 B2
(45) Date of Patent: Feb. 23, 2021

(54) AUTOMATIC ANALYZING APPARATUS

(71) Applicant: JEOL Ltd., Tokyo (JP)

(72) Inventor: Takashi Yaginuma, Tokyo (JP)

(73) Assignee: JEOL Ltd., Tokyo (JP)

(*) Notice: Subject to any disclaimer, the term of this patent is extended or adjusted under 35 U.S.C. 154(b) by 299 days.

(21) Appl. No.: 16/062,298

(22) PCT Filed: Dec. 8, 2016

(86) PCT No.: PCT/JP2016/086495
§ 371 (c)(1),
(2) Date: Jun. 14, 2018

(87) PCT Pub. No.: WO2017/104523
PCT Pub. Date: Jun. 22, 2017

(65) Prior Publication Data
US 2018/0369769 A1 Dec. 27, 2018

(30) Foreign Application Priority Data
Dec. 16, 2015 (JP) .............................. JP2015-244843

(51) Int. Cl.
*B01F 15/00* (2006.01)
*B01F 7/00* (2006.01)
(Continued)

(52) U.S. Cl.
CPC .... *B01F 15/00448* (2013.01); *B01F 7/00408* (2013.01); *B01F 7/00725* (2013.01);
(Continued)

(58) Field of Classification Search
CPC .......... B01F 15/00448; B01F 15/00681; B01F 2015/00603; B01F 7/00725; B01F 7/1605; B01F 7/161; F16H 1/08
See application file for complete search history.

(56) References Cited

U.S. PATENT DOCUMENTS 3,796,108 A   3/1974  Kime et al.
6,058,793 A * 5/2000  Pasley ...................... F16H 1/20
                                                    184/6.12

FOREIGN PATENT DOCUMENTS

JP       5302928 A    11/1993
JP       8131802 A     5/1996
(Continued)

OTHER PUBLICATIONS

Extended European Search Report issued in EP16875503.1 dated Jun. 17, 2019.

(Continued)

*Primary Examiner* — Elizabeth Insler
(74) *Attorney, Agent, or Firm* — The Webb Law Firm

(57) ABSTRACT

An automatic analyzing apparatus includes a stirring mechanism. The stirring mechanism is provided with: a fixed member fixed to an apparatus body; a motor attached to the fixed member; a drive-side helical gear provided on a drive shaft of the motor; bearings provided to the fixed member with the center shaft held parallel to the drive shaft of the motor; a support member of circular column shape, supported so as to be capable of receding from one side relative to the bearings; a driven-side helical gear fixed to an end of the support member coaxially with respect to the support member such that the driven-side helical gear is fitted together with the drive-side helical gear with the support member recessed into the bearings; and a stirring rod extending coaxially with the support member from the end of the support member opposite to the end provided with the driven-side helical gear.

4 Claims, 5 Drawing Sheets

(51) Int. Cl.
  *B01F 11/00*   (2006.01)
  *G01N 35/00*   (2006.01)
  *G01N 35/02*   (2006.01)
  *G01N 1/38*    (2006.01)

(52) U.S. Cl.
  CPC ...... *B01F 7/00841* (2013.01); *B01F 11/0097*
      (2013.01); *B01F 15/00538* (2013.01); ***G01N
      35/00* (2013.01); *G01N 35/02*** (2013.01); *B01F
          2015/00623* (2013.01); *B01F 2215/0037*
              (2013.01); *G01N 1/38* (2013.01); *G01N
              2035/00465* (2013.01); *G01N 2035/00534*
                                                (2013.01)

(56) References Cited

FOREIGN PATENT DOCUMENTS

| JP | 201521944  | A  | 2/2015 |         |
|----|------------|----|--------|---------|
| WO | 0021651    | A1 | 4/2000 |         |
| WO | W-0021651  | A1 * | 4/2000 | ................ B01F 7/22 |

OTHER PUBLICATIONS

Notice of Reasons for Refusal issued in JP2015-244843 dated on Jun. 3, 2019.

\* cited by examiner

US 10,926,232 B2

AUTOMATIC ANALYZING APPARATUS

CROSS-REFERENCE TO RELATED APPLICATIONS

This application is the United States national phase of International Application No. PCT/JP2016/086495 filed Dec. 8, 2016, and claims priority to Japanese Patent Application No. 2015-244843 filed Dec. 16, 2015, the disclosures of which are hereby incorporated in their entirety by reference.

BACKGROUND OF THE INVENTION

Field of the Invention

The present invention relates to automatic analyzing apparatuses, and more particularly to an automatic analyzing apparatus including a stirring mechanism for stirring a sample solution containing a specimen to be analyzed.

Description of Related Art

An automatic analyzing apparatus includes a stirring mechanism for stirring a mixed solution in a reaction vessel, the mixed solution containing predetermined amounts of specimen and reagent that have been dispensed into the reaction vessel. A disclosed example of a stirring mechanism includes a plate-shaped stirring element that stirs a mixed solution; a circular-column-shaped support that supports the stirring element; a vibrating unit that vibrates the stirring element; and a rotating unit that rotates the stirring element. In this structure, the rotating unit includes a motor with a rotating shaft that is coupled to the support and a drive circuit that drives the motor. The motor is supported by a stirring arm, and the rotating shaft thereof is disposed on the central axis that passes through the centers of the top and bottom surfaces of the support disposed below the motor (see Japanese Unexamined Patent Application Publication No, 2015-21944).

Since the above-described stirring mechanism includes the rotating unit, when the amount of mixed solution is less than or equal to a predetermined amount, the stirring element may be rotated so that the mixed solution in the reaction vessel can be evenly stirred in a short time without spattering the mixed solution upward.

However, since the above-described stirring mechanism is structured such that the rotating shaft of the motor is disposed on the central axis of the circular-column-shaped support that supports the stirring element, it is difficult to reduce unsteady movement of the plate-shaped stirring element. Therefore, there is a limit to the rotational speed of the stirring element, and the mixed solution cannot be sufficiently stirred in a short time. As a result, it is difficult to achieve highly reproducible and accurate analysis.

SUMMARY OF THE INVENTION

Accordingly, an object of the present invention is to provide an automatic analyzing apparatus that is capable of rotating a stirring rod at a high speed and is thereby capable of achieving highly reproducible and accurate analysis.

To achieve the above-described object, an automatic analyzing apparatus according to the present invention includes a stirring mechanism including a fixed member fixed to an apparatus body; a motor attached to the fixed member; a driving helical gear provided on a drive axis of the motor; a bearing provided on the fixed member with a central axis thereof maintained parallel to the drive axis of the motor; a support member having a circular column shape and supported so as to be insertable into the bearing from one side of the bearing; a driven helical gear fixed to an end of the support member coaxially with the support member, the driven helical gear meshing with the driving helical gear when the support member is inserted in the bearing; and a stirring rod extending coaxially with the support member from an end of the support member opposite to the end at which the driven helical gear is provided.

According to the automatic analyzing apparatus of the present invention, the stirring rod can be rotated at a high speed, and highly reproducible and accurate analysis can therefore be achieved.

DESCRIPTION OF THE INVENTION

In the following description, an embodiment of a stirring mechanism included in an automatic analyzing apparatus of the present invention and the structure of the automatic analyzing apparatus of the present invention including the stirring mechanism will be described in that order with reference to the drawings.

<<Structure of Stirring Mechanism>>

Figure 1:
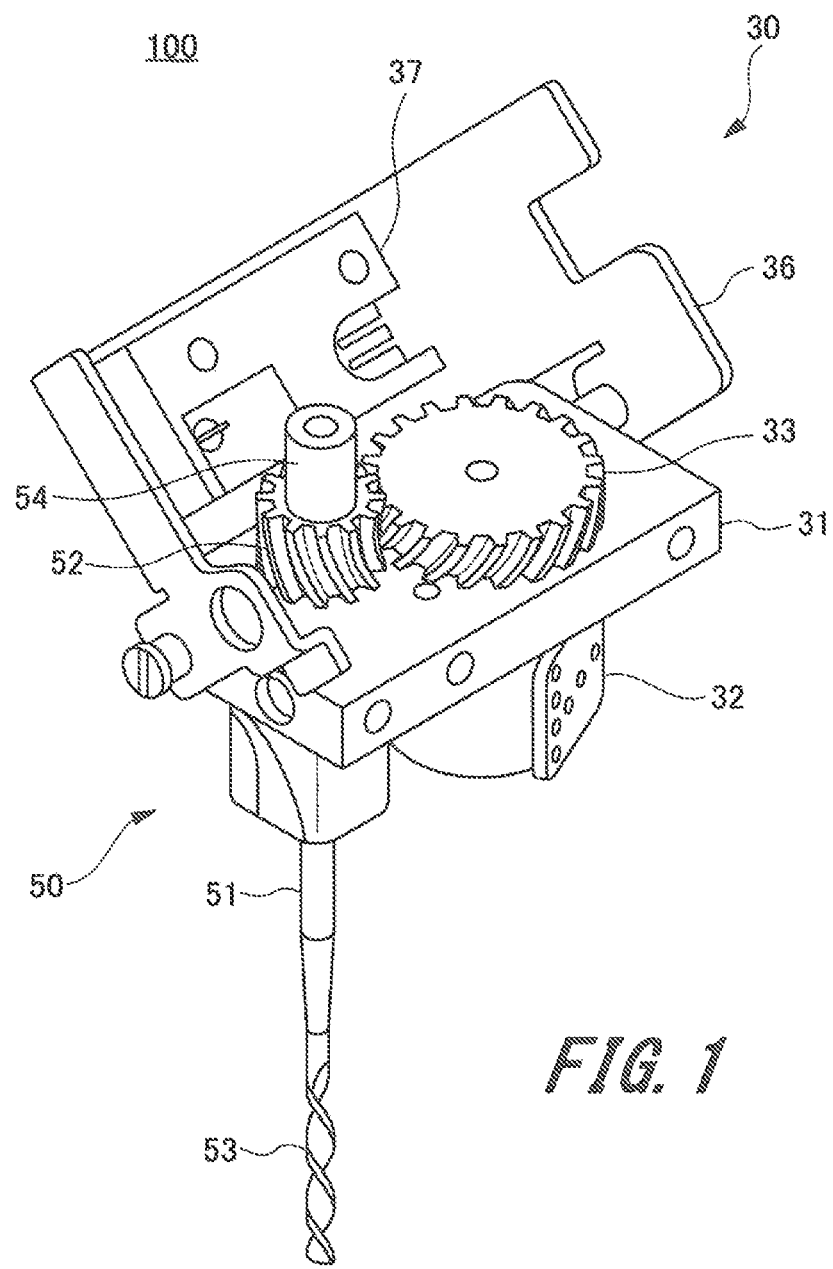
FIG. 1 is a perspective view of a stirring mechanism of an automatic analyzing apparatus according to an embodiment.
Figure 2:
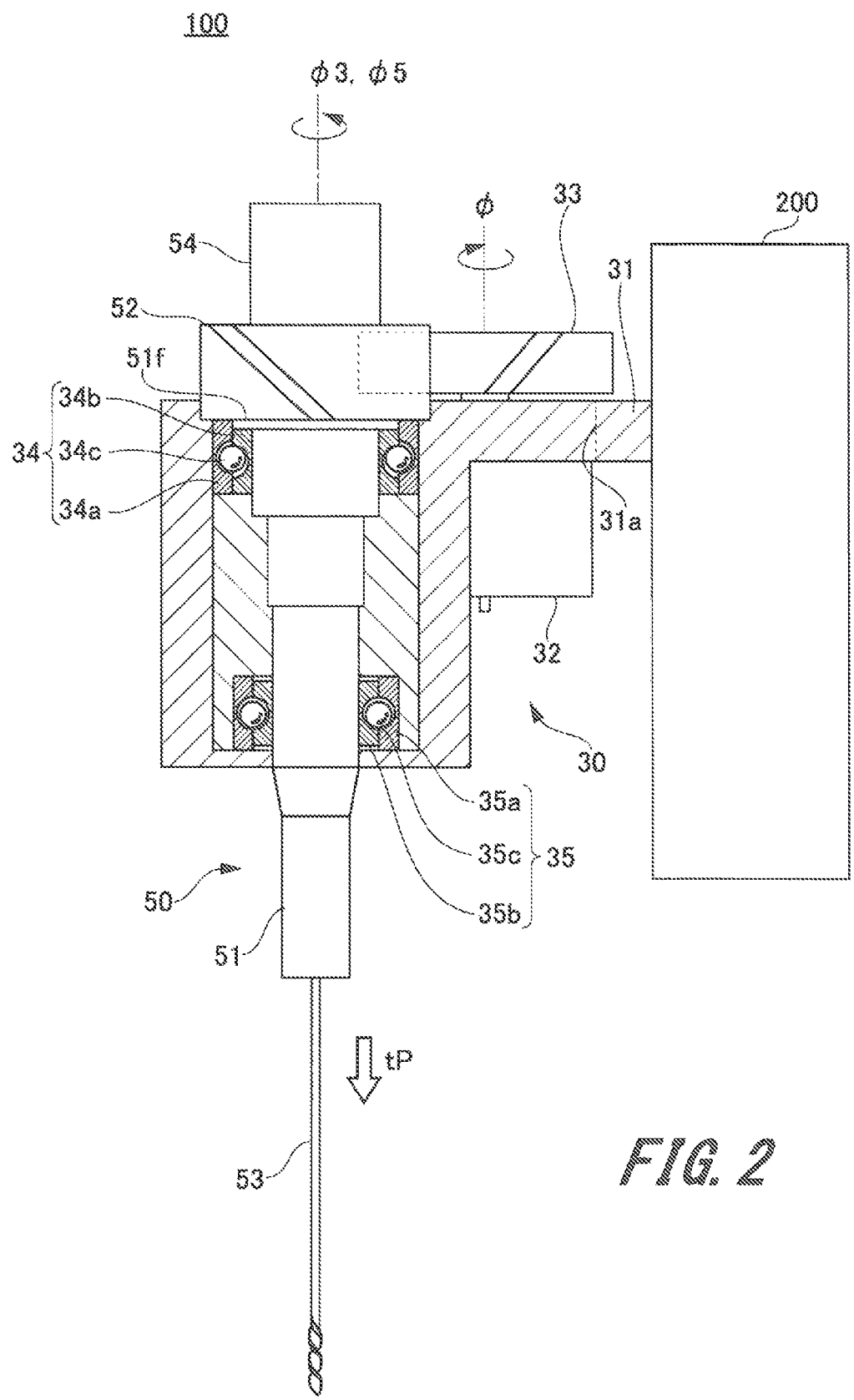
FIG. 2 is a sectional view of the main part of the stirring mechanism illustrated in FIG. 1.
Figure 3:
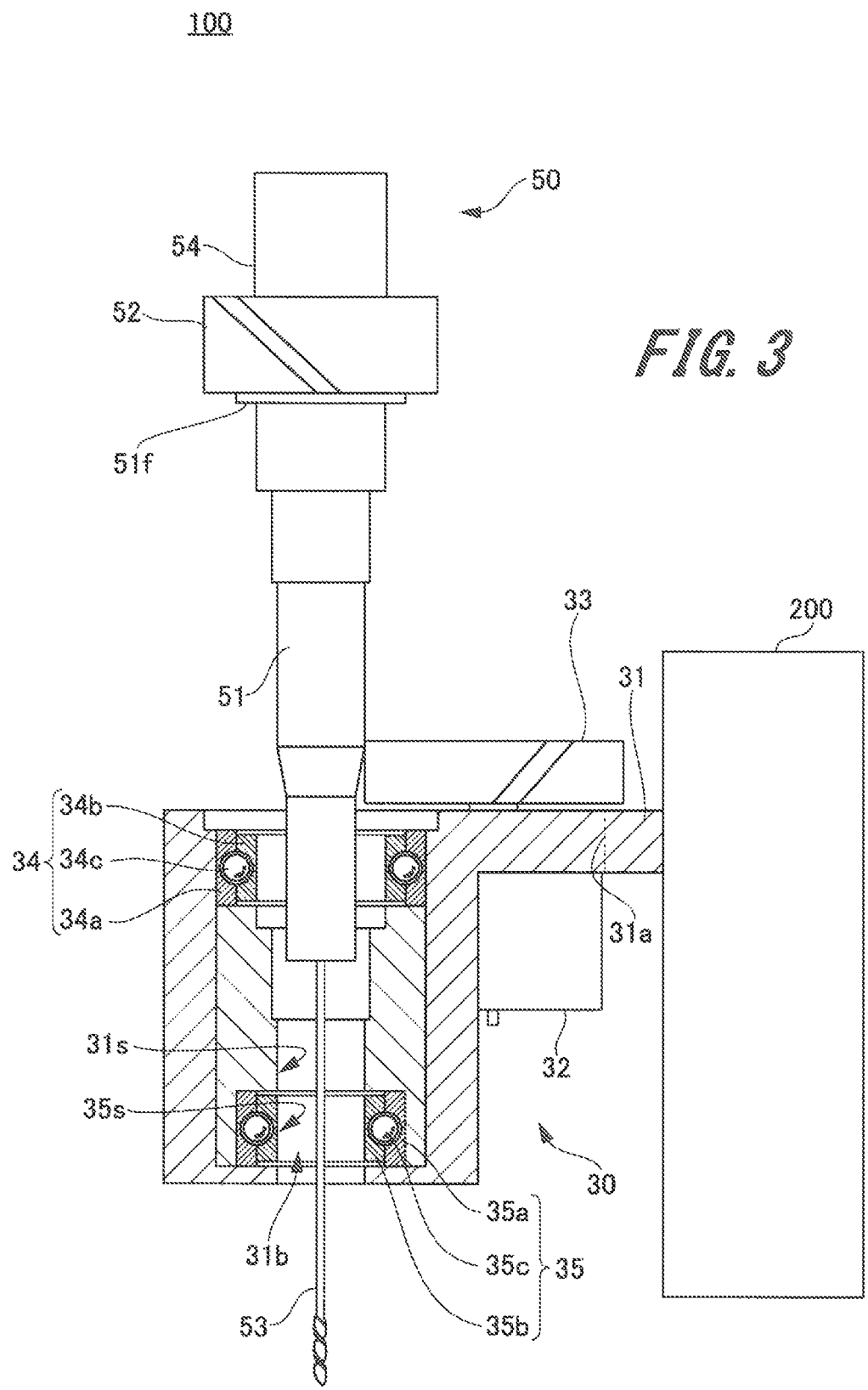
FIG. 3 is another sectional view of the main part of the stirring mechanism illustrated in FIG. 1.

FIG. 1 is a perspective view of a stirring mechanism 100 of an automatic analyzing apparatus according to an embodiment. FIG. 2 is a sectional view of the main part of the stirring mechanism 100 illustrated in FIG. 1, illustrating a cross section during a stirring operation. FIG. 3 is another sectional view of the main part of the stirring mechanism 100 illustrated in FIG. 1, illustrating a cross section in the case where a portion of the stirring mechanism 100 is removed for maintenance.

The stirring mechanism 100 illustrated in the above-described drawings is included in the automatic analyzing apparatus, and includes a fixed unit 30 that is fixed to an apparatus body of the automatic analyzing apparatus and a removable unit 50 that is removably attached to the fixed unit 30. The fixed unit 30 includes a fixed member 31; a motor 32; a driving helical gear 33; a plurality of bearings, which are illustrated only in FIGS. 2 and 3 (a large-diameter bearing 34 and a small-diameter bearing 35 in this example); and a cover member 36 and a sensor member 37, which are illustrated only in FIG. 1. The removable unit 50 includes a support member 51, a driven helical gear 52, a stirring rod 53, and a knob 54. These components will be described in detail below.

<Fixed Member 31 (Fixed Unit 30)>

The fixed member 31 is used to fix the stirring mechanism 100 to the apparatus body, and is fixed to the apparatus body with, for example, a driving mechanism 200 (see FIGS. 2 and 3) for driving the stirring mechanism 100 interposed therebetween. The fixed member 31 is a housing member that extends from the driving mechanism 200, and includes a motor-retaining hollow portion 31a in which the motor 32 is retained and a bearing hollow portion 31b (see FIG. 3) in which the large-diameter bearing 34 and the small-diameter bearing 35 are retained.

The motor-retaining hollow portion 31a has a housing that supports the motor 32 such that the motor 32 projects upward with a drive axis φ of the motor 32 extending vertically.

The bearing hollow portion 31b is a through-hole-shaped space formed in the fixed member 31 so as to extend parallel to the drive axis φ of the motor 32. The upper open-end side of the bearing hollow portion 31b serves as an insertion side from which the removable unit 50 is inserted, and the bearings (large-diameter bearing 34 and small-diameter bearing 35 in this example) are coaxially arranged in the bearing hollow portion 31b in decreasing order of inner diameter from the top.

The bearing hollow portion 31b is formed so that, when the large-diameter bearing 34 and the small-diameter bearing 35 are disposed therein, the region where the small-diameter bearing 35 is disposed has the smallest inner diameter among the regions where the large-diameter bearing 34 and the small-diameter bearing 35 are disposed. The bearing hollow portion 31b having such a structure is formed so that, for example, a single axis that is parallel to the drive axis φ of the motor 32 serves as a central axis φ3 thereof and that the inner diameter thereof decreases with increasing distance from the top toward the bottom.

The bearing hollow portion 31b retains a bearing other than the large-diameter bearing 34 that is located uppermost and that has the largest diameter (small-diameter bearing 35 in this example) in such a manner that the bearing is embedded in an inner wall 31s of the bearing hollow portion 31b. As illustrated in FIG. 3, a portion of the inner wall 31s of the bearing hollow portion 31b that is immediately above the small-diameter bearing 35 is flush with an inner wall 35s of the small-diameter bearing 35.

Accordingly, the inner wall of the bearing hollow portion 31b serves as a guide when the removable unit 50 is inserted from above, so that the removable unit 50 can be inserted without being obstructed by the inner wall of the bearing hollow portion 31b. The bearing hollow portion 31b, in which the large-diameter bearing 34 and the small-diameter bearing 35 are disposed, may have an inner diameter that decreases stepwise as illustrated, or may include a portion having an inclined inner surface.

When the large-diameter bearing 34 and the small-diameter bearing 35, which will be described below, are rolling bearings, such as ball bearings, the bearing hollow portion 31b retains the large-diameter bearing 34, which is located uppermost and which has the largest diameter, such that at least an inner race 34b of the large-diameter bearing 34 is upwardly exposed.

<Motor 32 (Fixed Unit 30)>

The motor 32 is inserted in the motor-retaining hollow portion 31a of the fixed member 31 and fixed to the fixed member 31 such that the motor 32 projects upward with the drive axis φ thereof extending vertically. The motor 32 is preferably rotatable at a high speed, for example, at about 1500 rpm.

Although not illustrated, the motor 32 is provided with a controller, which controls the motor 32 during a stirring operation so that a thrust load applied to the driven helical gear 52 described below is a thrust load tP in a direction toward the large-diameter bearing 34 and the small-diameter bearing 35.

<Driving Helical Gear 33 (Fixed Unit 30)>

The driving helical gear 33 is a parallel axis gear that meshes with the driven helical gear 52 of the removable unit 50. The driving helical gear 33 is provided on the drive axis φ of the motor 32 such that the rotation axis thereof coincides with the drive axis φ of the motor 32. The driving helical gear 33 rotates along a horizontal plane when the motor 32 is driven.

<Large-Diameter Bearing 34 and Small-Diameter Bearing 35 (Fixed Unit 30)>

The large-diameter bearing 34 and the small-diameter bearing 35 are disposed in the bearing hollow portion 31b of the fixed member 31 with the central axis φ3 thereof maintained parallel to the drive axis φ of the motor 32. As described above in the description of the structure of the bearing hollow portion 31b, the large-diameter bearing 34 and the small-diameter bearing 35 are arranged in the bearing hollow portion 31b in decreasing order of inner diameter from the top so that a single axis that is parallel to the drive axis φ of the motor 32 serves as the central axis φ3 thereof. In the illustrated example, the upper side is the insertion side from which the removable unit 50 including the support member 51 is inserted, and the large-diameter bearing 34 disposed at the insertion side has an inner diameter greater than that of the small-diameter bearing 35 disposed at the other side. The above-described relationship does not change even when three or more bearings are provided.

Among the large-diameter bearing 34 and the small-diameter bearing 35, a bearing other than the large-diameter bearing 34 that is located uppermost and that has the largest diameter (small-diameter bearing 35 in this example) is retained such that the bearing is embedded in the inner wall 31s of the bearing hollow portion 31b. As illustrated in FIG. 3, the inner wall 35s of the small-diameter bearing 35 is flush with a portion of the inner wall 31s of the bearing hollow portion 31b that is immediately above the small-diameter bearing 35.

Accordingly, the removable unit 50 can be inserted into the bearing hollow portion 31b, in which the large-diameter bearing 34 and the small-diameter bearing 35 are disposed, without being obstructed by the small-diameter bearing 35.

Preferably, the large-diameter bearing 34 and the small-diameter bearing 35 described above are rolling bearings, such as ball bearings illustrated in the drawings. In this case, the large-diameter bearing 34 includes an outer race 34a fixed to the fixed member 31 in the bearing hollow portion 31b, an inner race 34b disposed inside the outer race 34a, and balls 34c disposed between the outer race 34a and the inner race 34b. Similarly, the small-diameter bearing 35 includes an outer race 35a fixed to the fixed member 31 in the bearing hollow portion 31b, an inner race 35b disposed inside the outer race 35a, and balls 35c disposed between the outer race 35a and the inner race 35b.

In this case, the large-diameter bearing 34, which is located uppermost and which has the largest diameter, is fixed to the fixed member 31 such that the upper surface of the inner race 34b is upwardly exposed in the fixed member 31.

<Cover Member 36 (Fixed Unit 30)>

The cover member 36 illustrated in FIG. 1 holds the sensor member 37, which will be described next, and prevents the driven helical gear 52 from being removed. The cover member 36 is attached to the fixed member 31. The driven helical gear 52 and the knob 54 of the removable unit 50, which will be described next, and the driving helical gear 33 are disposed between the cover member 36 and the fixed member 31. The cover member 36 is coupled to the fixed member 31 by, for example, a hinge, and is capable of covering and exposing the accommodating space between the cover member 36 and the fixed member 31.

There is no particular limitation regarding the above-described cover member as long as the sensor member 37 faces the driving helical gear 33 when the accommodating space between the cover member and the fixed member 31 is covered by the cover member. It is not necessary that the cover member have a function of preventing the driven helical gear 52 from being removed from the driving helical gear 33.

<Sensor Member 37 (Fixed Unit 30)>

The sensor member 37 illustrated in FIG. 1 is used to control the rotational speed of the motor 32, and is disposed on a side of the cover member 36 that faces the accommodating space, that is, that faces the fixed member 31. The sensor member 37 is, for example, an encoder including a Hall element disposed so as to face the driving helical gear 33 when the cover member 36 is closed.

<Support Member 51 (Removable Unit 50)>

As illustrated in FIGS. 2 and 3, the support member 51 is supported by the large-diameter bearing 34 and the small-diameter bearing 35 when the removable unit 50 is inserted in the bearing hollow portion 31$b$ of the fixed member 31 in which the large-diameter bearing 34 and the small-diameter bearing 35 are disposed. The support member 51 includes coaxially arranged circular-column-shaped portions having diameters corresponding to the inner diameters of the large-diameter bearing 34 and the small-diameter bearing 35. Among the circular-column-shaped portions, the circular-column-shaped portion having a diameter corresponding to the inner diameter of the large-diameter bearing 34 has the largest diameter. Accordingly, the end of the support member 51 at which the circular-column-shaped portion having a small diameter is disposed is defined as the tip end, and the support member 51 is inserted into the bearing hollow portion 31$b$ from the tip end thereof. The support member 51 is supported by the large-diameter bearing 34 and the small-diameter bearing 35 at the circular-column-shaped portions having the respective diameters.

The support member 51 includes a flange portion 51$f$ that is placed on the inner race 34$b$ of the large-diameter bearing 34 when the support member 51 is supported by the large-diameter bearing 34 and the small-diameter bearing 35 disposed in the bearing hollow portion 31$b$. Accordingly, the inner race 34$b$ of the large-diameter bearing 34 is pressed downward by the flange portion 51$f$, and the balls 34$c$ are brought into close contact with the outer race 34$a$ and the inner race 34$b$, so that the support member 51 can be reliably centered.

<Driven Helical Gear 52 (Removable Unit 50)>

The driven helical gear 52 is a parallel axis gear that meshes with the driving helical gear 33 of the fixed unit 30. The driven helical gear 52 is coaxially fixed to the support member 51 at an end of the support member 51 at which the flange portion 51$f$ is provided. The driven helical gear 52 meshes with the driving helical gear 33 when the support member 51 is inserted in and supported by the large-diameter bearing 34 and the small-diameter bearing 35 disposed in the bearing hollow portion 31$b$.

When the motor 32 is driven to rotate the driving helical gear 33 along a horizontal plane, the rotation of the driving helical gear 33 is transmitted to the driven helical gear 52, so that the driven helical gear 52 and the support member 51 rotate together about a single rotation axis $\phi5$. At this time, the rotation axis $\phi5$ coincides with the central axis $\phi3$ of the bearing hollow portion 31$b$ in which the large-diameter bearing 34 and the small-diameter bearing 35 are disposed, and is maintained parallel to the drive axis $\phi$ of the motor 32.

<Stirring Rod 53 (Removable Unit 50)>

The stirring rod 53 is inserted into a reaction vessel (not illustrated), and is used to stir a mixed solution of a specimen and a reagent dispensed into the reaction vessel. The stirring rod 53 extends coaxially with the support member 51 along the rotation axis $\phi5$ from an end of the support member 51 opposite to the end adjacent to the driven helical gear 52. The shape of the stirring rod 53 is not particularly limited as long as the stirring rod 53 is capable of stirring the mixed solution by rotating about the rotation axis $\phi5$. The stirring rod 53 has the shape of, for example, a flat plate or a screw obtained by twisting a flat plate as illustrated in the figures.

<Knob 54 (Removable Unit 50)>

The knob 54, which is held when the removable unit 50 is attached to or removed from the fixed unit 30, is provided on the rotation axis $\phi5$ of the driven helical gear 52. The knob 54 preferably has the shape of a circular column whose axis coincides with the rotation axis $\phi5$ of the driven helical gear 52. Thus, the influence of the knob 54 on the rotation of the removable unit 50 about the rotation axis $\phi5$ can be eliminated.

<Effects of Stirring Mechanism>

In the stirring mechanism 100 having the above-described structure, the stirring rod 53 extends along the rotation axis $\phi5$ of the driven helical gear 52 that meshes with the driving helical gear 33. Therefore, in the illustrated example, when the driving helical gear 33 is rotated counterclockwise when viewed from above, the driven helical gear 52 is rotated by the driving helical gear 33, and receives a thrust load in a direction along the rotation axis $\phi5$. Accordingly, when the stirring operation is performed, the motor 32 may be driven in a rotation direction such that the driven helical gear 52 receives the thrust load tP in the direction toward the large-diameter bearing 34 and the small-diameter bearing 35. Thus, the removable unit 50 can be pressed toward the large-diameter bearing 34 and the small-diameter bearing 35 along the rotation axis $\phi5$. As a result, unsteady movement of the rotation axis $\phi5$ of the removable unit 50 can be prevented during the stirring operation. Since it is not necessary to consider the risk of gear removal or unsteady movement of the removable unit 50 during the stirring operation, the removable unit 50 can be prevented from being tilted due to a mechanism for reducing such a risk.

Therefore, the rotational speed of the stirring rod 53 of the removable unit 50 can be increased, and the stirring efficiency can be increased accordingly. In addition, since unsteady movement and tilting of the removable unit 50 can be prevented, the diameter of the screw-shaped stirring rod 53 can be increased. This also leads to an increase in the stirring efficiency.

The stirring mechanism 100 is structured such that the support member 51 disposed between the driven helical gear 52 and the stirring rod 53 is supported by the large-diameter bearing 34 and the small-diameter bearing 35 having different opening diameters. Accordingly, unsteady movement and tilting of the removable unit 50 can be more reliably prevented. In addition, during the above-described stirring operation, the inner race 34$b$ of the large-diameter bearing 34 is pressed toward the large-diameter bearing 34 and the small-diameter bearing 35 by the flange portion 51$f$ of the support member 51, so that the position of the balls 34$c$ between the outer race 34a and the inner race 34b is fixed. Therefore, the support member 51 can be reliably centered. In addition, since the support member 51 is coaxially supported by the large-diameter bearing 34 and the small-diameter bearing 35 having different sizes, the resonance points generated before the rotational speed of the removable unit 50 reaches the maximum rotational speed can be dispersed. This also contributes to the prevention of unsteady movement and tilting of the removable unit 50.

Furthermore, as described above, the stirring mechanism 100 does not need to have a mechanism for preventing gear removal or unsteady movement of the removable unit 50 during the stirring operation. Therefore, the structure can be simplified, so that the removable unit 50 can be easily removed from the fixed unit 30 and replaced for maintenance. In addition, the motor 32 may be driven in a direction opposite to that in the stirring operation to apply a thrust load to the removable unit 50 in a direction opposite to that of the thrust load tP, so that the removable unit 50 can be more easily removed from the fixed unit 30.

<<Overall Structure of Automatic Analyzing Apparatus>>

Figure 4:
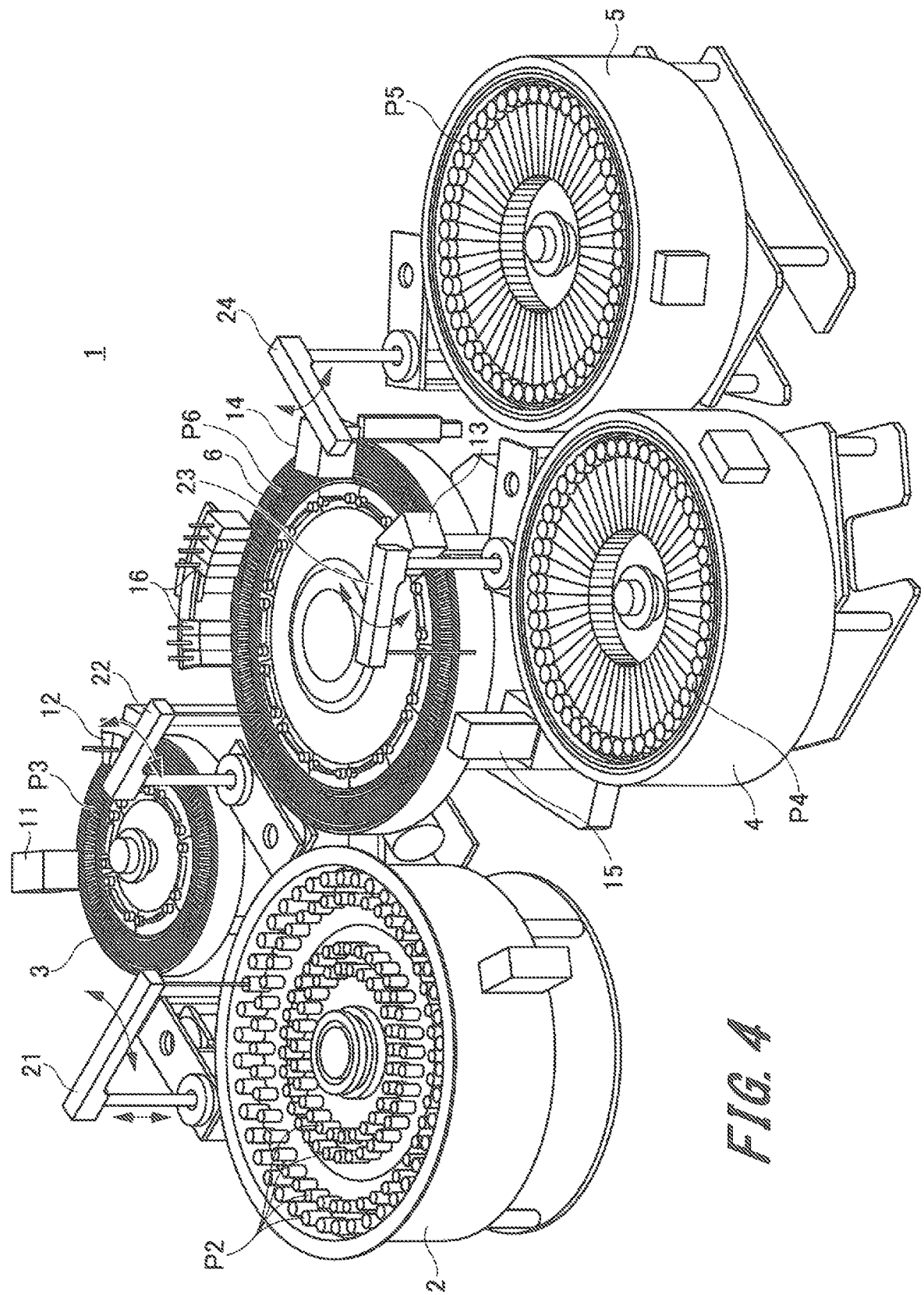
FIG. 4 is a schematic diagram illustrating the automatic analyzing apparatus according to the embodiment.

FIG. 4 is a schematic diagram illustrating an example of the automatic analyzing apparatus according to the embodiment of the present invention. The automatic analyzing apparatus 1 illustrated in FIG. 4 is a biochemical analyzer that analyzes a biochemical component contained in a specimen such as blood or urine, and includes stirring mechanisms having the above-described structure.

The automatic analyzing apparatus 1 includes a sample turntable 2, a dilution turntable 3, a first reagent turntable 4, a second reagent turntable 5, and a reaction turntable 6, which have the shape of a substantially cylindrical container that is open at one end thereof in an axial direction (upper end in FIG. 1). The automatic analyzing apparatus 1 also includes a dilution stirring device 11, a dilution cleaning device 12, a first reaction stirring device 13, a second reaction stirring device 14, a multi-wavelength photometer 15, and a reaction-vessel cleaning device 16. The automatic analyzing apparatus 1 also includes a sample dilution pipette 21, a sampling pipette 22, a first reagent pipette 23, and a second reagent pipette 24.

In the automatic analyzing apparatus 1 according to the present embodiment, among the above-described components, the dilution stirring device 11, the first reaction stirring device 13, and the second reaction stirring device 14 each include the above-described stirring mechanism. In the following description, each component of the automatic analyzing apparatus 1 will be described in detail.

<Sample Turntable 2>

The sample turntable 2 retains a plurality of specimen containers P2 arranged in a plurality of lines concentric to the periphery thereof, and conveys the retained dilution containers P3 in both circumferential directions. The specimen containers P2 retained by the sample turntable 2 contain test specimens that are to be tested and control specimens (quality control samples) used for quality control. The sample turntable 2 carries various types of test specimens at predetermined locations. The sample turntable 2 may retain diluent containers, which contain diluents, in addition to the specimen containers P2.

<Dilution Turntable 3>

The dilution turntable 3 retains a plurality of dilution containers P3 arranged along the periphery thereof, and conveys the retained dilution containers P3 in both circumferential directions. Test specimens that have been sucked out of the specimen containers P2 on the sample turntable 2 and diluted (hereinafter referred to as "diluted specimens") are introduced into the dilution containers P3 retained by the dilution turntable 3.

<First Reagent Turntable 4 and Second Reagent Turntable 5>

The first reagent turntable 4 and the second reagent turntable 5 respectively retain a plural of first reagent containers P4 and P5 arranged along the peripheries thereof, and convey the retained first reagent containers P4 and second reagent containers P5 in both circumferential directions. A first reagent is dispensed into the first reagent containers P4 retained by the first reagent turntable 4 from a reagent bottle. A second reagent is dispensed into the second reagent containers P5 retained by the second reagent turntable 5 from a reagent bottle.

<Reaction Turntable 6>

The reaction turntable 6 is disposed so as to be surrounded by the dilution turntable 3, the first reagent turntable 4, and the second reagent turntable 5. The reaction turntable 6 retains a plurality of reaction vessels P6 along the periphery thereof, and conveys the retained reaction vessels P6 in both circumferential directions. A predetermined amount of diluted specimen obtained from one of the dilution containers P3 on the dilution turntable 3 is dispensed into one of the reaction vessels P6 on the reaction turntable 6. In addition, a predetermined amount of first reagent obtained from one of the first reagent containers P4 on the first reagent turntable 4 or a predetermined amount of second reagent obtained from one of the second reagent containers P5 on the second reagent turntable 5 is dispensed into the reaction vessel P6. The diluted specimen is stirred with the first reagent or the second reagent and caused to react with the first reagent or the second reagent in the reaction vessel P6.

The reaction turntable 6 is provided with a constant temperature bath (not illustrated) that constantly maintains the temperature of the reaction vessels P6 at a certain temperature.

<Dilution Stirring Device 11>

Figure 5A:
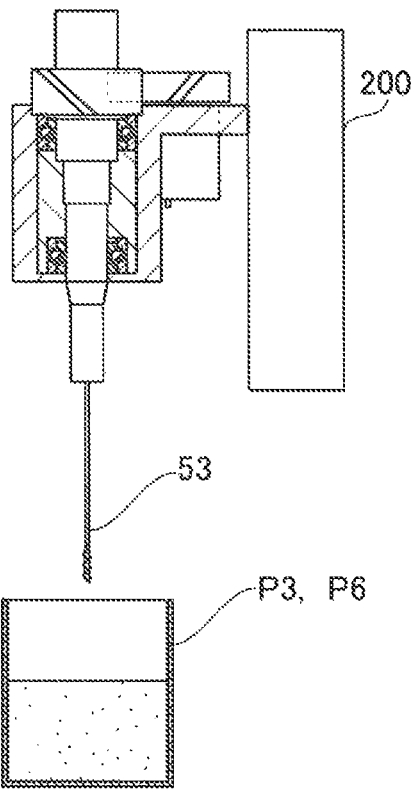
FIGS. 5A and 5B illustrate the operation of the stirring mechanism of the automatic analyzing apparatus according to the embodiment.
Figure 5B:
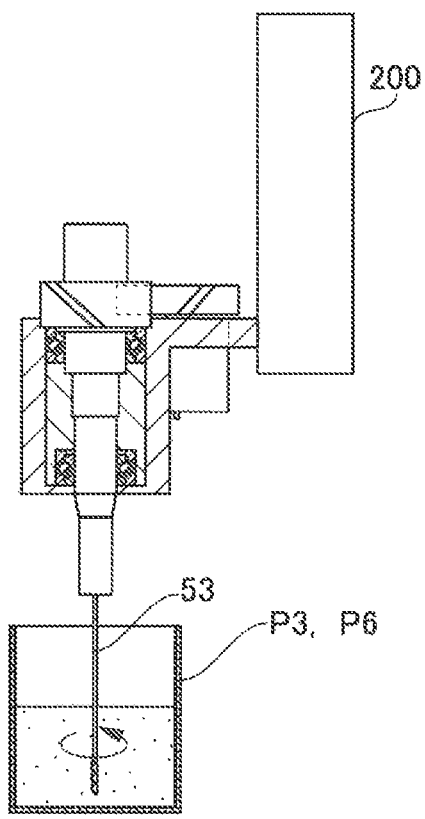

The dilution stirring device 11 is disposed at the periphery of the dilution turntable 3. The dilution stirring device 11 stirs the test specimen and diluent in each dilution container P3. The dilution stirring device 11 includes the stirring mechanism according to the above-described embodiment and the driving mechanism for driving the stirring mechanism. As illustrated in FIGS. 5A and 5B, the dilution stirring device 11 includes the driving mechanism 200 fixed to the apparatus body and the stirring mechanism 100 fixed to the driving mechanism 200. The driving mechanism 200 moves the stirring mechanism 100 at a predetermined location on the dilution turntable 3 to insert the stirring rod 53 into the solution (diluted specimen) in one of the dilution containers P3 that is retained by the dilution turntable 3 at the predetermined location. After the stirring rod 53 is inserted into the solution (diluted specimen) in the dilution container P3, the stirring rod 53 is rotated to stir the solution (diluted specimen).

<Dilution Cleaning Device 12>

The dilution cleaning device 12 is disposed at the periphery of the dilution turntable 3. The dilution cleaning device 12 cleans the dilution containers P3 after the diluted specimens are sucked out therefrom by a sampling pipette 22, which will be described below.

<First Reaction Stirring Device 13 and Second Reaction Stirring Device 14>

The first reaction stirring device 13 and the second reaction stirring device 14 are disposed at the periphery of the reaction turntable 6. The first reaction stirring device 13 and the second reaction stirring device 14 stir the diluted specimens together with the first reagent and the second reagent, respectively, in the reaction vessels P6 retained by the reaction turntable 6. Each of the first reaction stirring device 13 and the second reaction stirring device 14 includes the stirring mechanism according to the above-described embodiment and the driving mechanism for driving the stirring mechanism. As illustrated in FIGS. 5A and 5B, each of the first reaction stirring device 13 and the second reaction stirring device 14 includes the driving mechanism 200 fixed to the apparatus body and the stirring mechanism 100 fixed to the driving mechanism 200. The driving mechanism 200 moves the stirring mechanism 100 at a predetermined location on the reaction turntable 6 so that, in one of the reaction vessels P6 retained by the reaction turntable 6 at the predetermined location, the diluted specimen is stirred with the first reagent or the second reagent and caused to react with the first reagent or the second reagent.

<Multi-Wavelength Photometer 15>

The multi-wavelength photometer 15, which is a measurement unit, is disposed so as to face an outer wall of the reaction turntable 6 at the periphery of the reaction turntable 6. The multi-wavelength photometer 15 performs an optical measurement on the diluted specimens that have reacted with the first and second reagent solutions in the reaction vessels P6, and outputs the amounts of various components of the specimens in the form of numerical data representing "absorbance". Thus, the multi-wavelength photometer 15 detects the reactions of the diluted specimens.

<Reaction-Vessel Cleaning Device 16>

The reaction-vessel cleaning device 16 cleans the inside of the reaction vessels P6 after the test. The reaction-vessel cleaning device 16 includes a plurality of reaction-vessel cleaning nozzles. Similar to a dilution-container cleaning nozzle, the reaction-vessel cleaning nozzles are connected to a waste solution pump (not illustrated) and a detergent pump (not illustrated).

<Sample Dilution Pipette 21>

The sample dilution pipette 21 is disposed at the periphery of the sample turntable 2 and the dilution turntable 3. The sample dilution pipette 21 is driven by a dilution-pipette-driving mechanism (not illustrated) so that a tip portion thereof is inserted into one of the specimen containers P2 on the sample turntable 2 and that a predetermined amount of test specimen is sucked into the tip of the pipette, which is filled with a diluent, with a dead air space provided between the diluent and the test specimen. Then, the tip portion of the sample dilution pipette 21 is inserted into one of the dilution containers P3 on the dilution turntable 3, and the test specimen that has been sucked and a predetermined amount of diluent (for example, saline) supplied from the sample dilution pipette 21 are discharged into the dilution container P3. As a result, the test specimen is diluted by a predetermined factor in the dilution container P3. After that, the sample dilution pipette 21 is cleaned by a cleaning device.

<Sampling Pipette 22>

The sampling pipette 22 is disposed between the dilution turntable 3 and the reaction turntable 6. The sampling pipette 22 is driven by a sampling-pipette-driving mechanism (not illustrated) so that a tip portion thereof is inserted into one of the dilution containers P3 on the dilution turntable 3 and that a predetermined amount of diluted specimen is sucked into the tip of the pipette, which is filled with a diluent, with a dead air space provided between the diluent and the diluted specimen. Then, the diluted specimen that has been sucked into the sampling pipette 22 is discharged into one of the reaction vessels P6 on the reaction turntable 6. Thus, the diluted specimen is introduced into the reaction vessel P6.

<First Reagent Pipette 23>

The first reagent pipette 23 is disposed between the reaction turntable 6 and the first reagent turntable 4. The first reagent pipette 23 is driven by a first-reagent-pipette-driving mechanism (not illustrated) so that a tip portion thereof is inserted into one of the first reagent containers P4 on the first reagent turntable 4 and that a predetermined amount of first reagent is sucked into the tip of the pipette, which is filled with a diluent, with a dead air space provided between the diluent and the first reagent. Then, the first reagent that has been sucked into the first reagent pipette 23 is discharged into one of the reaction vessels P6 on the reaction turntable 6.

<Second Reagent Pipette 24>

The second reagent pipette 24 is disposed between the reaction turntable 6 and the second reagent turntable 5. The second reagent pipette 24 is driven by a second-reagent-pipette-driving mechanism (not illustrated) so that a tip portion thereof is inserted into one of the second reagent containers P5 on the second reagent turntable 5 and that a predetermined amount of second reagent is sucked into the tip of the pipette, which is filled with a diluent, with a dead air space provided between the diluent and the second reagent. Then, the second reagent that has been sucked into the second reagent pipette 24 is discharged into one of the reaction vessels P6 on the reaction turntable 6.

<Effects of Automatic Analyzing Apparatus 1>

In the automatic analyzing apparatus 1 having the above-described structure, the dilution stirring device 11, the first reaction stirring device 13, and the second reaction stirring device 14 each include the stirring mechanism according to the above-described embodiment. Therefore, the test specimens can be stirred with the diluent at a high speed and positioning accuracy in the dilution containers P3. In addition, the diluted specimens can be stirred with the first or second reagent at a high speed and positioning accuracy in the reaction vessels P6. As a result, in particular, the diluted specimens reliably and quickly react with the first or second reagent in the reaction vessels P6, and highly reproducible and accurate analysis can be achieved.

REFERENCE SIGNS LIST

1 automatic analyzing apparatus
31 fixed member
31*b* bearing hollow portion
31*s* inner wall (bearing hollow portion)
32 motor
φ drive axis
33 driving helical gear
35 bearing
35*b* inner race (bearing)
35*s* inner wall (bearing)
φ3 central axis (bearing)
51 support member
51*f* flange (support member)
φ5 rotation axis (removable unit including support member)
52 driven helical gear
53 stirring rod
54 knob
100 stirring mechanism

The invention claimed is:

1. A stirring mechanism for use with an automatic analyzing apparatus, the stirring mechanism comprising:

a fixed unit comprising:
  a fixed member fixed to an apparatus body,
  a motor attached to the fixed member,
  a driving helical gear provided on a drive axis of the motor, and
  a bearing provided on the fixed member with a central axis thereof maintained parallel to the drive axis of the motor, wherein the bearing comprises a plurality of bearings arranged coaxially, the plurality of bearings comprising at least a first bearing having a top side and a bottom side and a second bearing, and
a removable unit removably attached to the fixed unit, the removable unit comprising:
  a support member having a circular column shaped and supported so as to be insertable into the bearing from the top side of the first bearing and having a portion thereof positioned between the first bearing and the second bearing when the support member is inserted into the fixed member,
  a driven helical gear fixed to an end of the support member coaxially with the support member, the driven helical gear meshing with the driving helical gear when the support member is inserted in the bearing, and
  a stirring rod extending coaxially with the support member from an end of the support member opposite to the end to which the driven helical gear is fixed, the stirring rod comprising a stirring portion provided at a tip end portion of the stirring rod,
wherein the driven helical gear is located above the top side of the first bearing when the support member is inserted into the fixed member, such that the stirring rod is configured to be pulled away from the fixed member in a direction away from the top side of the first bearing so as to be removable therefrom,
wherein the first bearing is disposed near a side from which the support member is inserted having an inner diameter greater than an inner diameter of the second bearing that is disposed near the other side,
wherein the support member includes a plurality of circular-column-shaped portions having diameters corresponding to the inner diameters of the bearings, and is supported by the bearings at the circular-column-shaped portions.

2. The stirring mechanism according to claim 1, wherein the fixed member has a hollow portion in which the plurality of bearings are disposed, and
  wherein one or more of the plurality of bearings other than the first bearing and the second bearing are embedded in an inner wall of the hollow portion so that inner walls thereof are flush with the inner wall of the hollow portion.

3. The stirring mechanism according to claim 1, wherein at least the first bearing is a rolling bearing, and
  wherein the support member includes a flange placed on an inner race of the first bearing when the support member is inserted in the first bearing.

4. The stirring mechanism according to claim 1, wherein a knob is provided on a rotation axis of the driven helical gear so as to project from the driven helical gear.

* * * * *